United States Patent

Toshima et al.

[11] Patent Number: 5,831,774
[45] Date of Patent: Nov. 3, 1998

[54] LIGHT DIFFUSION COMPOSITE

[75] Inventors: Yasumaro Toshima, Yono; Takaaki Kato, Ina-machi, both of Japan

[73] Assignee: Kimoto Co., Ltd., Tokyo, Japan

[21] Appl. No.: 781,712

[22] Filed: Jan. 10, 1997

[30] Foreign Application Priority Data

Jan. 12, 1996 [JP] Japan .................................. 8-021915

[51] Int. Cl.$^6$ ........................... G02B 13/20; G03B 21/60
[52] U.S. Cl. ........................... 359/707; 359/452; 359/455
[58] Field of Search ................................. 359/621, 624, 359/452, 453, 455, 456, 457, 707

[56] References Cited

U.S. PATENT DOCUMENTS 4,730,897  3/1988  McKechnie et al. ................. 359/452

FOREIGN PATENT DOCUMENTS 5-73601   10/1993  Japan .
5-73602   10/1993  Japan .
6-59107   3/1994   Japan .
6-59108   3/1994   Japan .
3010871   3/1995   Japan .

*Primary Examiner*—Scott J. Sugarman
*Attorney, Agent, or Firm*—Burns, Doane, Swecker & Mathis, L.L.P.

[57] ABSTRACT

A light diffusion composite comprises a first prism sheet, a second prism sheet and a light diffusion material disposed in this order from the light emitting surface. The light diffusion material comprises a transparent support and a light diffusion layer formed on the support. The light diffusion layer comprises an acrylic resin as a binder resin and light diffusion agents including acrylic resin particles and silicone resin particles. The light diffusion composite has better luminance in the front direction than the conventional light diffusion sheet and also has good light diffusibility.

7 Claims, 1 Drawing Sheet

LIGHT DIFFUSION COMPOSITE

BACKGROUND OF THE INVENTION

1. Field of the Invention

The present invention relates to light diffusion sheets used for luminaires, electric signboards, subsurface projection screens, liquid crystal displays and the like.

2. Prior Art

As a light diffusion sheet for a subsurface illuminator of a liquid crystal display, a light diffusion sheet prepared by applying a transparent resin solution including inorganic particles or resin particles on one side of a transparent plastic film has been used.

The light diffusion sheet is required to hide the light diffusion pattern of a light conducting plate and to produce high luminance in the front direction.

Improvements for better meeting these requirements have been directed to changing the kind or quantity of the light diffusion particles or resins of the light diffusion layer.

However, since such improvements achieve only limited performance with regard to luminance in the front direction, the idea of using a prism sheet to direct light in the peripheral direction to the front comes to mind. However, the prism sheet must be used together with the conventional light diffusion sheet, since it does not have light diffusibility.

However, when the prism sheet is covered with the light diffusion sheet, light directed to the front by the prism sheet is diffused and the performance thereof becomes similar to use of the diffusion sheet alone.

Accordingly, an object of the present invention is to solve the above problems by providing a light diffusion composite which achieves better luminance in the front direction than the conventional light diffusion sheets and also provides good light diffusibility.

SUMMARY OF THE INVENTION

To achieve the above object, the present invention provides a light diffusion composite comprising a light diffusion material and two prism sheets, wherein the light diffusion material comprises a transparent support and a light diffusion layer formed on the support. The light diffusion layer includes binder resin and resin particles.

Further, the present invention is characterized in that the binder resin used for the light diffusion layer is acrylic resin and the resin particles are acrylic resin particles and silicone resin particles.

The amount of the resin particles included in the light diffusion layer is preferably in the range from 40 to 120 parts by weight based on 100 parts by weight of the binder resin. The amount of the acrylic resin particles and that of the silicone resin particles are 10–110 parts by weight and 10–40 parts by weight respectively based on 100 parts by weight of the binder resin.

A light diffusion composite according to one aspect of the present invention is characterized in that the first prism sheet, the second prism sheet and the light diffusion material are disposed in this order from the light emitting surface of the composite.

A light diffusion composite according to another aspect of the present invention is characterized in that the first prism sheet and the second prism sheet are disposed so that their ridgelines intersect at right angles.

The term "light diffusion composite" used herein is broadly defined to include not only a sheet but also a plate, a film, a laminate or the like.

DETAILED EXPLANATION OF THE INVENTION

Figure 1:
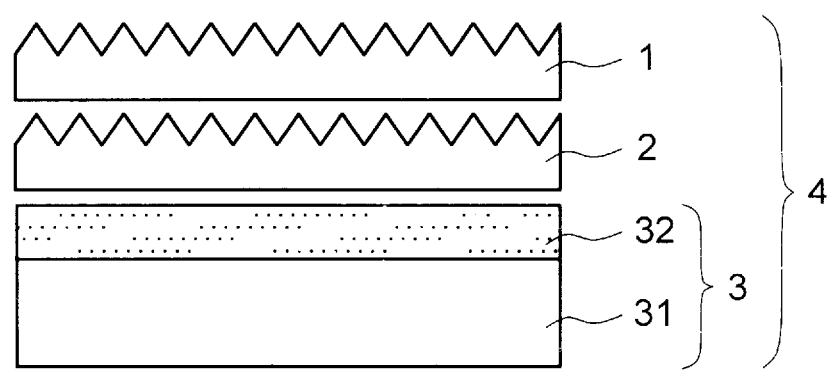
FIG. 1 is a cross-sectional view of a light diffusion composite which is an embodiment of the present invention. In the drawing, the numeral 1 represents the first prism sheet, the numeral 2 represents the second prism sheet and the numeral 3 represents the light diffusion material.

A light diffusion composite of the present invention will be explained In detail hereinafter with reference to FIG. 1.

The light diffusion composite 4 of the present invention is composed of a light diffusion material 3 and two prism sheets 1, 2.

The light diffusion material 3 has a transparent support 31 and a light diffusion layer 32 laminated thereon.

The transparent support 31 of the light diffusion material 3 is made of a material having a high transmittance such as a film or a plate of polymethyl methacrylate, polycarbonate, polyvinyl chloride, polyester or acetate resin, a glass plate or the like. From the points of weather resistance, processing characteristics and the like, a polyester film is most preferable.

The light diffusion layer 32 consists mainly of binder resin and resin particles.

The binder resin of the light diffusion layer 32 may be optically transparent resin such as acrylic resin, polycarbonate, polyvinyl chloride, polystyrene, polyester, polyurethane or the like. Acrylic resin is preferable for its excellent weather resistance. Even more preferable is two-part curing type acrylic polyurethane. A resin with a large OH value which elevates the closslinking density is preferable so that a tough coating film can be obtained even if a large amount of pigment is incorporated.

The resin particles are required to diffuse light in the diffusion pattern of a light conducting plate with as little decrease as possible in the light directed to the front by the two prism sheets 1, 2.

A mixture of acrylic resin particles and silicone resin particles is preferably used as the resin particles. When acrylic resin particles used alone they must be added in a very large amount in order to hide the pattern of the light conducting plate. This is disadvantageous because it reduces the luminance in the front direction. On the other hand, when only silicone resin particles are used, a small amount thereof sufficies to improve the light difusibility but the same small amount also markedly lowers the luminance in the front direction.

The resin particles are preferably used in an amount of from 40 to 120 parts by weight in total, more preferably from 45 to 115 parts by weight, based on 100 parts by weight of the binder resin. When the amount of the resin particles is less than 40 parts by weight, the light diffusibility is poor and the light diffusion pattern of the light conducting plate can not be hidden. When the amount is more than 120 parts by weight, it is difficult to improve luminance in the front direction even though adjustment of the ratio between the acrylic resin particles and the silicone resin particles.

The acrylic resin particles are preferably used in an amount of from 10 to 110 parts by weight, more preferably from 15 to 95 parts by weight, based on 100 parts by weight of the binder resin. When the amount of the acrylic resin particles is less than 10 parts by weight, it is difficult to hide the light diffusion pattern of the light conducting plate without depressing the luminance in the front direction. When the amount of the acrylic resin particles is more than 110 parts by weight, the luminance in the front direction is lowered.

The acrylic resin particles are preferably spherical particles of polymethyl methacrylate (PMMA), which is preferably crosslinked by divinylbenzene or the like so as to have good heat resistance, solvent resistance and thermal stability.

The size of the acrylic resin particles is preferably from 1.0 to 30.0 $\mu$m. When the particle size is less than 1.0 $\mu$m, the particles do little to improve the luminace in the front direction. On the other hand, when the particle size is more than 30.0 $\mu$m, it is difficult to hide the light diffusion pattern of the light conducting plate without depressing the luminance in the front direction.

The silicone particles are preferably used in an amount of from 10 to 40 parts by weight, more preferably from 15 to 35 parts by weight, based on 100 parts by weight of the binder resin. When the amount of the silicone resin particles is less than 10 parts by weight, the light diffusibility is not sufficient. When the amount of the silicone resin particles is more than 40 parts by weight, the luminance in the front direction is lowered.

The size of the silicone resin particles is preferably from 0.5 to 12.0 $\mu$m. When the particle size is less than 0.5 $\mu$m, it is difficult to hide the light diffusion pattern of the light conducting plate without depressing the luminance in the front direction. When the particle size is more than 12.0 $\mu$m, the light diffusibility is not sufficient to hide the pattern of the light conducting plate.

Preferable methods for preparing the light diffusion material 3 include, for example, the method of dispersing or dissolving the binder resin and the spherical particles in a proper solvent and applying the solution to the support 31. As the application method, any conventional method such as spraying, dipping, roll-coating, curtain flow coating, Meyer bar coating or the like can be employed. The thickness of the light diffusion layer 32 is from 1 to 30 $\mu$m. The other side of the support 31 is preferably provided with an anti-Newton coating in order to prevent occurrence of Newton rings due to close contact with the light conducting plate.

Any of various commercially available products can be utilized as the prism sheets 1, 2 of the light diffusion composite of the present invention. A prism sheet with a high transparency and a high light harvesting ability is preferable. The first prism sheet 1 and the second prism sheet 2 may be the same or different.

The "prism sheet" of the present invention includes not only prism sheets with a predetermined apex angle but also prism sheets of various shapes such as round, ellipse or the like. The most preferable prism sheet is an ellipse-shaped prism sheet or a prism sheet with apex angles of from 90 to 100 degree. Examples of such prism sheets include prism sheets sold by Sumitomo 3M Co., Ltd. under the trade names of BEF90HP, BEFII90/50, 100/31 and BEF90, those sold by Mitsubishi Rayon Co., Ltd. under the trade names of DIA ART H150, H210, P150 and P210, that sold by Dai Nippon Printing Co., Ltd. under the trade name of PORTGRAM V7, that sold by Sumitomo Chemical Co., Ltd. under the trade name of LUMITHRU and those sold by Sekisui Chemical Co., Ltd. under the trade names of ESTINAWAVE W518 and W425 etc.

As shown in FIG. 1, the light diffusion material 3 is preferably placed so that the first prism sheet 1, the second prism sheet 2 and the light diffusion material 3 are placed in this order from the light emitting surface. In this manner, the light diffusion pattern of the light conducting plate is diffused to be invisible without reducing the light directed to the front. In addition, the prism surfaces of the prism sheets 1, 2 and the surface of the light diffusion layer 32 of the light diffusion material 3 are preferably directed in the light emitting direction. By placing them in this direction, the light diffusion pattern of the light conducting plate can be diffused and made invisible without reducing the light directed to the front.

Figure 2:
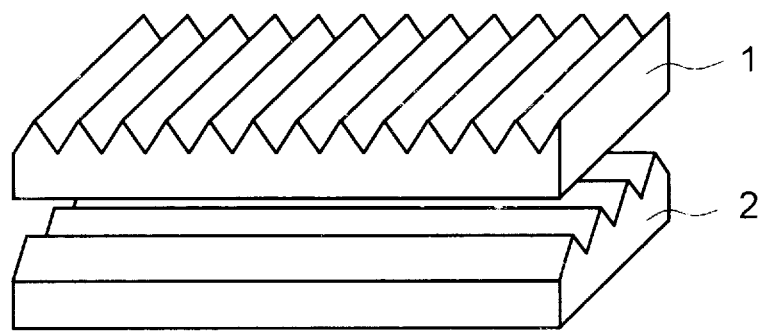
FIG. 2 is a perspective view showing the arrangement of two prism sheets according to the present invention.

Further, as shown in FIG. 2, the two prism sheets 1, 2 are preferably placed so that their ridgelines intersect at right angles. In this case, the light harvesting direction can be controlled in two directions, vertically or horizontally, and thus the luminance in the front direction is intensified.

A sheet having little light diffusibility (not shown in the Figs.) can be placed at the surface of the first prism, i.e., the outermost layer of the prism sheets. Use of such a sheet provides a number of advantages. The surface of the prism sheet is protected from scratching. Glare at the surface of the prism sheet is prevented. Light over-harvested by the prism is diffused to expand the angle of the visual field.

EXAMPLES

The present invention will be further explained with reference to working examples and comparative examples. The expressions "part" and "%" used herein mean "part by weight" and "% by weight" unless otherwise indicated.

EXAMPLES 1–6 AND COMPARATIVE EXAMPLES 1–7

Light diffusion materials were prepared by applying coating solutions including the resin particles listed in Table 1 in addition to the following composition to one side of polyester films (LUMIRROR T60, thickness: 100 $\mu$m, Toray Industries Inc.) and drying the solutions to form layers having a thickness of 12 $\mu$m.

Composition of the coating solution

Acrylic polyol (Solid content 50%) 162 parts (AcryDic A-807: DAI NIPPON Ink & Chemicals Inc.)

Isocyanate (Solid content 60%) 32 parts (Takenate D110N: Takeda Chemical Industries, Ltd.)

Methylethyl ketone 215 parts

Butyl acetate 215 parts

TABLE 1

| | Amount of resin particles per 100 parts of binder resin (solid part) (parts) | | |
|---|---|---|---|
| | acrylic resin particles | silicone resin particles | total amount |
| Example 1 | 55 | 15 | 70 |
| Example 2 | 55 | 20 | 75 |
| Example 3 | 55 | 35 | 90 |
| Example 4 | 25 | 20 | 45 |
| Example 5 | 15 | 30 | 45 |

TABLE 1-continued

| | Amount of resin particles per 100 parts of binder resin (solid part) (parts) | | |
|---|---|---|---|
| | acrylic resin particles | silicone resin particles | total amount |
| Example 6 | 95 | 20 | 115 |
| Comparative Example 1 | 55 | 0 | 55 |
| Comparative Example 2 | 55 | 5 | 60 |
| Comparative Example 3 | 55 | 45 | 100 |
| Comparative Example 4 | 0 | 20 | 20 |
| Comparative Example 5 | 5 | 20 | 25 |
| Comparative Example 6 | 15 | 20 | 35 |
| Comparative Example 7 | 120 | 20 | 140 |

As the resin particles, acrylic resin particles (MX-1000, average particle size: 10.0 μm, Soken Chemical & Engineering Co., Ltd.) and silicone resin particles (Tospearl 130, average particle size: 3.0 μm, Toshiba Silicone Co., Ltd.) were used.

Light diffusion composites were obtained by placing a second prism sheet (BEF90HP: Sumitomo 3M Co., Ltd.) on each light diffusion material so that the light diffusion layer of the light diffusion material faced the side of the prism sheet opposite its prism surface and placing a first prism sheet (BEF90HP: Sumitomo 3M Co., Ltd.) so that the prism surface of the second prism sheet faced the side of the first prism sheet opposite its prism surface. The two prism sheets were disposed so that the ridgelines intersected at right angles.

The light diffusion composites of Examples 1–6 and Comparative Examples 1–7 were respectively incorporated in backlight units for 5.5-inch liquid crystal displays. The units were provided with double lamps and a light conducting plate with a thickness of 5 mm. Luminance in the front direction of the display was measured. Luminance in the front direction without any light diffusion composite was also measured. The results are shown in Table 2. The luminance in the front direction was also evaluated visually and the results thereof are also shown in Table 2. In the visual evaluation of luminance, "◯" indicates that the viewer judged the luminance in the front direction to be very bright, "Δ" indicates that he judged it to be bright and "x" indicates that he judged it to be dark. In Table 2, "None" means that no light diffusion sheet was provided.

The results of visual evaluation of the light diffusibility are also shown in Table 2. In the visual evaluation of the light diffusibility, "◯" indicates that the pattern of the light conducting plate was completely invisible, "Δ" indicates that the pattern was slightly visible and "x" indicates that the pattern was clearly visible.

TABLE 2

| | Luminance in the front direction (cd/m$^2$) | Visual Evaluation of Luminance | Visual Evaluation of Diffusibility | Overall Evaluation |
|---|---|---|---|---|
| None | 400 | x | x | x |
| Example 1 | 2020 | ◯ | ◯ | ◯ |
| Example 2 | 2000 | ◯ | ◯ | ◯ |
| Example 3 | 1980 | ◯ | ◯ | ◯ |
| Example 4 | 1990 | ◯ | ◯ | ◯ |
| Example 5 | 1970 | ◯ | ◯ | ◯ |
| Example 6 | 1980 | ◯ | ◯ | ◯ |
| Comparative Example 1 | 2050 | ◯ | x | x |
| Comparative Example 2 | 2040 | ◯ | Δ | Δ |
| Comparative Example 3 | 1800 | Δ | ◯ | Δ |
| Comparative Example 4 | 1800 | Δ | x | x |
| Comparative Example 5 | 1850 | Δ | x | x |
| Comparative Example 6 | 1980 | ◯ | Δ | Δ |
| Comparative Example 7 | 1800 | Δ | ◯ | Δ |

As can be seen from the results shown in Table 2, luminance in the front direction was very high and the light diffusibility was good when any of the light diffusion composites of Examples 1 to 6 was used.

When the prism sheet of Comparative Example 1 was used, luminance in the front direction was high since the light diffusion material included only acrylic resin without silicone resin, but the pattern of the light conducting plate could be observed clearly.

The backlight unit of Comparative Example 2, where the amount of silicone resin particles was 5 parts by weight per 100 parts of binder resin, showed a high luminance but the light diffusion pattern of the light conducting plate was somewhat visible.

The backlight unit of Comparative Example 3, where the amount of silicone resin particles was 45 parts by weight per 100 parts of binder resin, showed good light diffusibility but somewhat less luminance than those of Examples 1–6.

The backlight units of Comparative Examples 4 and 5, where the amounts of acrylic resin were 0 parts and 5 parts respectively per 100 parts of binder resin, showed somewhat less luminance than those of Examples 1–6 and the light diffusion pattern of the light conducting plate was observed clearly.

The backlight unit of Comparative Example 6, where both the amount of acrylic resin and that of silicone resin were within suitable ranges, that is 15 parts and 20 parts respectively, showed high luminance but the light diffusion pattern of the light conducting plate was slightly observed since the total amount of the resin particles was small (35 parts per 100 parts of binder resin).

The backlight unit of Comparative Example 7, where the amount of acrylic resin particles was above the suitable range at 120 parts and the total amount of the resin particles was above the suitable range at the 140 parts, showed good light diffusibility but somewhat less luminance in the front direction than those of Examples 1–6.

EXAMPLE 7

A light diffusion composite was prepared in the same manner as in the Example 1, except that instead of the prism sheet (BEF90HP: Sumitomo 3M Co., Ltd.) of Example 1, another kind of prism sheet (DIA ART H150: Mitsubishi Rayon Co., Ltd.) was used for both of the two prism sheets.

EXAMPLE 8

A light diffusion composite was prepared in the same manner as in the Example 1, except that another kind of acrylic resin particles (TECH POLYMER MBX-8, average particle size: 8 $\mu$, Sekisui Chemical Co., Ltd.) and another kind of silicone resin particles (Tospearl 145, average particle size: 4.5 $\mu$m, Toshiba Silicone Co., Ltd.) were used.

The light diffusion composites of Examples 7 and 8 were evaluated in the same manner as in the Examples 1–6. Both the luminance and light diffusibility of these light diffusion composites were good. The results are shown in Table 3.

COMPARATIVE EXAMPLE 8

A commercially available light diffusion sheet (LIGHT UP SH: Kimoto Co. Ltd.) was used alone as a light diffusion sheet without a prism sheet. This light diffusion sheet has a light diffusion layer formed on a transparent support. The light diffusion layer comprises synthetic resin particles and inorganic particles having high refractivity which are dispersed in transparent resin.

COMPARATIVE EXAMPLE 9

A light diffusion composite was prepared by using a commercially available light diffusion sheet (LIGHT UP SH: Kimoto Co. Ltd.) as a light diffusion material and disposing it on prism sheets in the same manner as in the Example 1.

COMPARATIVE EXAMPLE 10

A light diffusion composite was prepared by disposing one prism sheet of Example 1 on the other without a light diffusion sheet.

The light diffusion composites of Comparative Examples 8–10 were evaluated in the same manner as in the Examples 1–6. The results are shown in Table 3.

The diffusibility of the light diffusion sheet of Comparative Example 8 and that of the light diffusion composite of Comparative Example 9 were good but the luminance in the front direction of each was very low.

The light diffusion composite of Comparative Example 10 showed little light diffusibility since it was not provided with the light diffusion material and the luminance in the front, direction was slightly darker than that of Example 1. It can be understood from the result of this Comprative Example, that provision of a light diffusion material of the present invention makes it possible to achieve good light diffusibility and enables to direct more light to the front than light directed to the front by the prism sheets.

TABLE 3

| | Luminance in the front direction (cd/m$^2$) | Visual Evaluation of Luminance | Visual Evaluation of Diffusibility | Overall Evaluation |
| --- | --- | --- | --- | --- |
| Example 7 | 1980 | ○ | ○ | ○ |
| Example 8 | 1970 | ○ | ○ | ○ |
| Comparative Example 8 | 950 | x | ○ | x |
| Comparative Example 9 | 1600 | x | ○ | x |

TABLE 3-continued

| | Luminance in the front direction (cd/m$^2$) | Visual Evaluation of Luminance | Visual Evaluation of Diffusibility | Overall Evaluation |
| --- | --- | --- | --- | --- |
| Comparative Example 10 | 1800 | Δ | x | x |

According to the light diffusion composite of the present invention, high luminance and high light diffusibility in a light diffusion composite with a prism sheet can be obtained, which has been considered to be difficult to attain hitherto.

We claim:

1. A light diffusion composite which comprises a light diffusion material and two prism sheets, wherein
    said light diffusion material comprises a transparent support and a light diffusion layer formed on said support, and
    said light diffusion layer comprises binder resin and from 40 to 120 parts by weight of resin particles based on 100 parts by weight of the resin binder.
2. A light diffusion composite which comprises a light diffusion material and two prism sheets, wherein
    said light diffusion material comprises a transparent support and a light diffusion layer formed on said support, and
    said light diffusion layer comprises binder resin, from 10 to 110 parts by weight of acrylic resin particles, and from 10 to 40 parts by weight of silicone resin particles, both based on 100 parts by weight of the resin binder.
3. A light diffusion composite having a light emitting surface, said light diffusion composite comprising a first prism sheet, a second prism sheet, and a light diffusion material disposed in this order from the light emitting surface, wherein
    said light diffusion material comprises a transparent support and a light diffusion layer formed on said support, and
    said light diffusion layer comprising binder resin and resin particles.
4. The light diffusion composite of claim 3, wherein the first prism sheet and the second prism sheet are disposed such that ridgelines of the first prism sheet intersect ridgelines of the second prism sheet at right angles.
5. The light diffusion composite of claim 3, wherein said light diffusion layer comprises from 40 to 120 parts by weight of the resin particles based on 100 parts by weight of the resin binder.
6. The light diffusion composite of claim 4, wherein said light diffusion layer comprises from 40 to 120 parts by weight of the resin particles based on 100 parts by weight of the resin binder.
7. A light diffusion composite which comprises a light diffusion material, a first prism sheet, and a second prism sheet, wherein
    said first prism sheet and said second prism sheet are disposed such that ridgelines of the first prism sheet intersect ridgelines of the second prism sheet at right angles,
    said light diffusion material comprises a transparent support and a light diffusion layer formed on said support, and
    said light diffusion layer comprising binder resin and resin particles.

* * * * *